June 7, 1927.
L. H. DYER
1,631,120
INTERNAL COMBUSTION ENGINE
Original Filed May 29, 1923
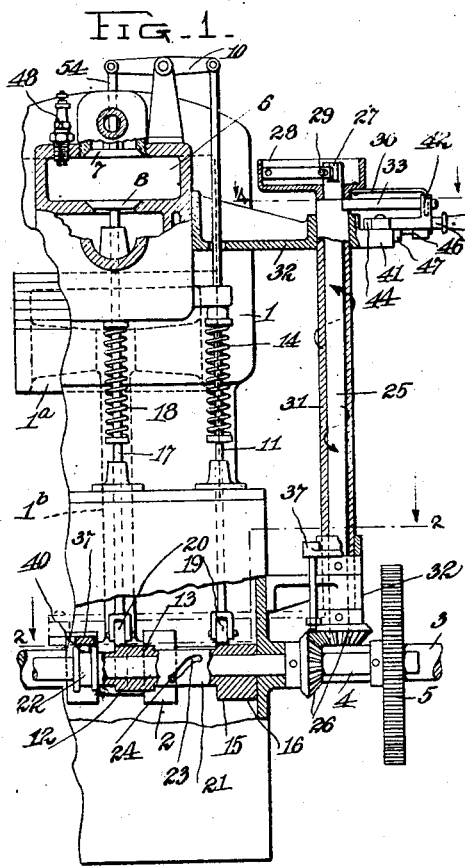
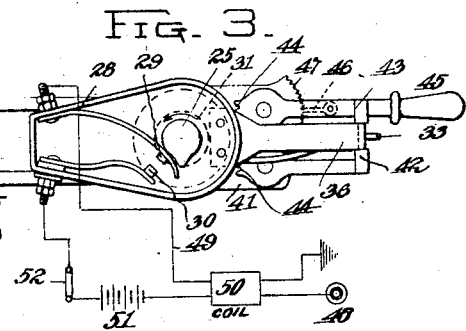
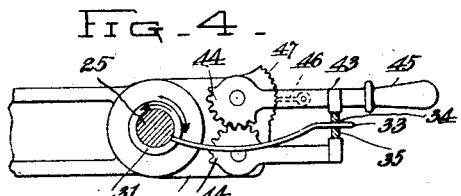
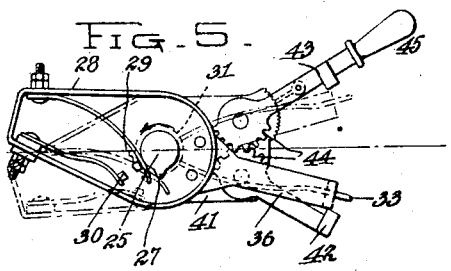
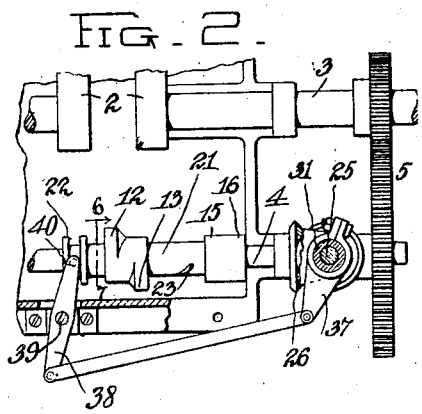
INVENTOR
Leonard H. Dyer
BY
Dyer + Taylor
ATTORNEYS Patented June 7, 1927.

1,631,120

UNITED STATES PATENT OFFICE.

LEONARD H. DYER, OF NEW YORK, N. Y.

INTERNAL-COMBUSTION ENGINE.

Original application filed May 29, 1923, Serial No. 642,231. Patent No. 1,560,506. Divided and this application filed August 27, 1925. Serial No. 52,719.

The invention relates to internal combustion engines, and is particularly directed to the production of such an engine which will be reversible and will run equally well in either direction.

The object of the invention is to provide means whereby the reversing may be accomplished from a point at a distance from the engine "on the switch" in engines equipped with jump spark, high tension ignition.

A further object is to produce an automatic setting of the spark advance or retardation in connection with reversible engines of either four stroke cycle or two stroke cycle type, with jump spark high tension ignition.

A further object is to produce a timing device for reversible internal combustion engines of the four stroke cycle type, in which the spark may be advanced or retarded while the engine is running in one direction and on reversal will be at the same degree of advancement, or retardation, for the new direction.

These and further objects will more fully appear in the following specification and accompanying drawings considered together or separately.

In the accompanying drawings, wherein is illustrated one embodiment of the invention, like parts in all of the several figures are designated by corresponding characters of reference, and in which Fig. 1 is a side elevation, partly in section, of an engine having a mechanically operated intake valve with jump spark ignition and embodying the invention.

Fig. 2 is a horizontal section taken on the line 2—2 of Fig. 1.

Fig. 3 is a top plan view, on an enlarged scale, of the interrupter box, showing the parts set for retarded spark.

Fig. 4 is a detail section, on an enlarged scale, taken on the line 4—4 of Fig. 1 and showing the parts in the same position.

Fig. 5 is a view similar to Fig. 3 but with the parts set for advance spark, the valve operating shaft rotating in the clockwise direction.

In the drawings 1 designates a cylinder, which may be that of a single cylinder engine, or one cylinder of a multi-cylinder engine. Within the cylinder is the usual piston $1^a$ connected up to a crank 2 of a shaft 3 by means of the well known form of connecting rod $1^b$. The usual valve operation cam shaft 4 is arranged to turn at half the speed of the crank shaft by means of suitable gearing 5.

The engine is provided with the usual ignition chamber 6 and with an intake valve 7, exhaust valve 8 and igniter 48. Both of the valves are mechanically operated and the ignition is of the jump spark high tension type. The intake valve 7 is moved to open position through a walking beam 10 and rod 11 from either of the intake cams 15 or 16 carried on the cam shaft 4, and to closed position by means of a spring 14. The exhaust valve 8 is moved to open position by means of either of two cams 12 or 13 also on the shaft 4, through a rod 17, and to closed position by means of a spring 18. The rod 11 carries a roller 19 working on the cams 15—16, and the rod 17 is provided with a roller 20 working on the cam 12—13.

The cams 12, 13 and 15, 16 are carried on, or are integral with, a sleeve 21 which is loosely mounted on the shaft 4 whereby said sleeve may be moved longitudinally of the shaft and also rotate relatively thereto. The sleeve is provided with a peripheral groove 22 for a purpose to be hereinafter described, and is also provided with a short spiral slot 23 into which a pin 24 carried by the shaft projects. The engagement of the pin 24 within the slot 23, which latter is inclined as shown, will move the sleeve longitudinally of the shaft to bring one or the other of the intake cams 15 or 16 into position beneath the roller 19, and the exhaust cams 12 or 13 into position beneath the roller 20. The sleeve 21 and the elements carried thereby are designed to be of sufficient weight whereby the momentum due to rotation in one direction, together with the inertia, will cause the sleeve to rotate relatively to the shaft when the direction of movement of the latter is suddenly changed.

Gradual slowing down of the engine, as by throttling, will not cause the sleeve to rotate relatively to the shaft because of the friction between the engaging surfaces turning in the same direction, and there will be constant resistance to change of relative position because of the engagement of the cams with the rollers 19 and 20 at every revolution of the sleeve.

It is to be noted that in addition to the sleeve 21 being moved longitudinally upon the shaft, it is also capable of rotation relatively to the shaft, and this must be taken into consideration in the locations of the cams relatively to the slot.

In the embodiment of the invention illustrated, a timing shaft 25 is geared to the shaft 4, as at 26 whereby both shafts will rotate at the same speed. The shaft 25 carries, at its upper end, an interrupter cam 27 located in a box 28 surrounding the top of the said shaft. Carried within the box are two spring contacts 29 and 30 adapted to make contact by the engagement of the cam 27 with one of them.

The box 28 is adapted to be rotated relatively to the shaft 25 whereby the spark may be advanced or retarded, as is well understood. The shaft 25 is surrounded by a sleeve 31, which latter is carried in bearings 32, and the box 28 has a bearing on the shaft and is supported on the top end of the sleeve. The upper end of the sleeve carries a setting spring 33 which projects more or less radially from the upper end of the sleeve. The free end of the spring engages within a slot 34 in the down-turned end 35 of an arm 36 rigidly secured to and extending radially from the box.

To the lower end of the sleeve 31 is clamped, or otherwise secured, a radially extending arm 37 the free end of which is connected by means of a pitman to one end of a lever 38 pivoted at 39 to the wall of the crank casing. The opposite end of the lever 38 extends through an opening into the crank casing and carries a roller 40 resting in the groove 22 of the sleeve 21. This arrangement provides means for moving the sleeve 21 longitudinally to shift the valve cams when the ignition devices are adjusted to effect the timing to change the direction of movement of the main crank shaft. Upon the longitudinal movement of the cam shaft 21 it is rotated in one direction or the other by the spiral groove 23 and pin 24 to automatically set the pairs of cams to properly time the exhaust and inlet valves with reference to the movement of the piston.

Rotatably mounted on an extension 41 of the bearing 32 are an advanced stop member 42, for clockwise movement, and an advance stop member 43 for anti-clockwise movement of the crank shaft. The members carry blocks adapted to cooperate with the down-turned end 35 of the arm 36, and determine the limits to which the setting spring 33, through its engagement with the arm, will oscillate the box 28 to secure the desired advance or retardation of spark. The members 42 and 43 are geared together as at 44 whereby they may be moved at equal distances from the medial line. One of said members is provided with an operating handle 45 whereby when said member is moved the other will be moved an equal distance but in the opposite direction. A finger 46 carried on the handle member and engaging a rack 47 on the extension 41 acts to retain the members in set position.

Projecting into the explosion chamber 6 is an igniting device, an ordinary spark plug for example, 48, and said plug is in an electric circuit 49 which includes a coil 50, a battery 51, a switch 52 and the interrupter contacts 29 and 30, as shown in Fig. 3.

In the embodiment of the invention illustrated, the exhaust cams 12 and 13 are approximately 180° apart, the spiral slot 23 is about 90° in extent, and the intake cams 15 and 16 are coincident and are about 90° from the cams 12 and 13.

In operation it will be understood that the engine crank shaft may be assumed to be rotating in either direction with a corresponding rotation of the cam-shaft in the opposite direction. The pairs of complementary exhaust and inlet valve cams 12—15 and 13—16 are so positioned with reference to the movement of the piston in the cylinder that their respective exhaust and inlet valves are opened and closed at the proper moments, according to the selected or assumed direction of rotation of the crank shaft 3. It will be assumed that the crank shaft 3 is rotating in a clockwise direction, thus causing the cam shaft to move anti-clockwise and that the cam sleeve 21 being at the extreme right of its movement has rotated the sleeve 31 causing the setting spring 33 to move the arm 36 against the stop 42, carrying the box 28 into the position shown in full lines, Fig. 5, whereby when the contact is made between the contacts 29 and 30 by the cam 27, the spark is produced in advance position for one direction of rotation of the crank shaft.

If it is desired to reverse the direction of rotation of the engine the ignition circuit may be opened, as by means of a switch 52 located at any convenient point, without disturbing the adjusted position of the circuit contacts 29 and 30. Upon opening the circuit the engine speed will slow down, but if the circuit is now closed before the engine has stopped the momentum of the parts causes the valve control mechanism and ignition control devices to be automatically shifted for continued rotation in the reverse direction. Upon closing the circuit as the engine slackens its speed ignition will occur before the ascending piston reaches the top of its stroke causing it to be driven down, or reversed, thus reversing the direction of rotation of the crank shaft into an anti-clockwise direction. The effect of this will be to cause relative rotation of the cam shaft 4 and its sleeve 21. That is, the sleeve will continue for a partial rotation in its former direction due to its momentum and its inertia, while the cam shaft is making its first partial turn in the anti-clockwise direction of engine movement. The effect of the pin 24 working in the spiral slot 23 will move the sleeve to the left, in Fig. 2, and bring the cams 13 and 16 beneath the cam rods 17 and 11 respectively to operate the valves 8 and 7 to correspond with the new direction or anti-clockwise direction of rotation of the crank shaft.

The movement of the sleeve 21 to the left, as above described, will rotate the sleeve 31 in a direction, to cause the arm 36 to be thrown into engagement with the stop 43, thus moving the interrupter box 28 to the position shown by dotted lines in Fig. 5, and causing the contact points 29 and 30 to be shifted so that the "spark" or time of closing the ignition circuit will be in a corresponding position of advance with relation to the piston movement with the crank shaft 3 rotating in the anti-clockwise direction.

To retard the spark the members 42 and 43 are moved toward each other to shift the position of the circuit contacts 29 and 30 relatively to the cam 27 by bringing their carrier or box 28 toward the medial line.

It is to be understood that the invention is not limited to engines having battery ignition, as illustrated in Fig. 3 as, obviously, magneto ignition may be employed.

It is to be further understood that the cams 15 and 16 may be omitted, and the valve 7 be opened by the movement of the incoming mixture on the suction stroke of the piston. In such an arrangement the rod 11 and walking beam 10 will be omitted, and the spring 14 carried on the top of the engine and cooperate with the stem 54 of the intake valve, as is common.

While the invention has been illustrated and described in connection with an engine of the four stroke cycle type, it is to be understood that the same may be carried out in two stroke cycle engines having high tension or jump spark ignition.

A two stroke cycle engine of the three port type will have no valves; one of the two port type will have but one valve to each cylinder, and that valve will be of the automatic type, therefore the cams illustrated for the operation of the valves in a four stroke cycle type will not be necessary, and the sleeve 21, will be used solely for moving the fixed member of the interrupter box, to secure the proper timing of spark in both directions of rotation of the engine.

This application is a divison of my copending application on which patent No. 1,560,506 was granted November 3, 1925.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described what is claimed as new and desired to be secured by Letters Patent, is—

1. In a reversible internal combustion engine of the character described, the combination with an ignition control mechanism adjustable to time the ignition in the cylinder with reference to the position of the piston therein in respect to engine operation in one direction, of a shifting device controlling the valves to effect a reversal of the direction of engine operation automatically when the engine speed is slackened by a temporary cessation of the firing of the explosive mixture, and means controlled by the engine in rotating in the opposite direction for shifting the ignition mechanism to control the engine operation in said opposite direction in the same manner as in the original direction of operation.

2. In a reversible internal combustion engine of the character described, the combination with a jump spark ignition system, having control means adjustable to regulate the firing of the explosive mixture with reference to the position of the piston in the cylinder for the most effective operation of the engine in one direction, of a switch for opening and closing the ignition circuit, automatic valve control devices actuated upon the slackening of engine speed when said circuit is open to shift the valves and cause the engine to operate in the other direction upon the closing of said circuit, and means controlled by the engine upon its commencing to move in a reverse direction for automatically shifting the ignition control means to likewise regulate the firing of the explosive mixture with reference to the position of the piston in the cylinder and the timed relation of the valve movement upon said reverse engine movement.

3. In an internal combustion engine of the character described, the combination with a jump spark ignition system comprising an engine driven element and circuit contacts movable relatively to said element to advance the spark, of manually adjustable stops movable in opposite directions with reference to a normal position of said contacts to limit their movement, a member actuated when the engine is operating in one direction to move the contacts into engagement with one of the stops and operating upon the reversal of engine movement to move said contacts automatically into engagement with the other stop.

4. In a reversible internal combustion engine, the combination with an ignition system comprising a pair of contacts, a movable carrier therefor and a rotatable engine driven element for operating the contacts, of a pair of adjustable stops movable toward and from each other with reference to the neutral position of said carrier, an oscillatory member operated in a given direction upon movement of the engine in one direction, and reversely upon movement of the engine in the other direction, and a connection between said member and the carrier for moving the latter from engagement with one of said stops into engagement with the other upon reversal of the direction of engine movement.

5. In a reversible internal combustion engine, the combination with an ignition system comprising a pair of contacts, a movable support therefor and a rotatable engine driven element for operating the contacts, of a pair of adjustable stops movable toward and from each other into fixed positions with reference to the neutral position of said support, an oscillatory member operated in a given direction upon movement of the engine in one direction and reversely upon movement of the engine in the other direction, and a spring connection between said member and the support which is put under tension to move the support into engagement with one of the stops when the member is moved in one direction and to shift said support into engagement with the other stop upon movement of the member in the opposite direction.

6. In a reversible internal combustion engine, the combination with an ignition system comprising a circuit having contacts, a carrier for the contacts mounted for oscillatory movement and an engine driven element for closing the contacts, an oscillatory member moved in one direction upon movement of the engine in one direction and in the other direction upon movement of the engine in a reverse direction, stops cooperating with the carrier and adjustable into fixed positions relatively to the neutral position of said carrier to limit its movement in opposite directions, and a yielding connection between the carrier and the oscillatory member for shifting the former from one stop to the other upon changes occurring in its direction of movement.

7. In a reversible internal combustion engine comprising a cylinder having a piston and a valve, the combination with a shaft rotated by the engine and a cam sleeve rotated by the shaft and actuating the valve and movable longitudinally of the shaft when the direction of rotation of the engine is reversed, of an ignition system comprising a timer having a rotating part and an adjustable non-rotating part for advancing and retarding the spark, stops adjustable relatively to the neutral position of the last mentioned part for regulating the amount of spark advance, and connections between the cam sleeve and said member for moving it into engagement with one of said stops.

8. In a reversible internal combustion engine comprising a cylinder having a piston and a valve, the combination with a shaft rotated by the engine and a cam sleeve rotated by the shaft and actuating the valve and movable longitudinally of the shaft by momentum when the direction of rotation of the engine is reversed, of an ignition system comprising a timer having a rotating part and an oscillatory adjustable part for advancing and retarding the spark, stops adjustable relatively to the neutral position of such oscillatory part for regulating the amount of spark advance, and connections between the cam sleeve and said member for holding it in engagement with one of the stops when the engine is moving in one direction and for switching it into engagement with the other stop upon the longitudinal movement of said cam sleeve upon the reversal of the direction of engine movement.

9. An internal combustion engine having jump spark ignition, comprising an intake valve and an exhaust valve, a shaft rotated by the engine, means for reversing the direction of rotation of the shaft, a sleeve carried on the shaft, a cam on the sleeve for actuating the intake valve, a cam on the sleeve for actuating the exhaust valve, said member being movable longitudinally of the shaft, an electric timer having a member rotated by the shaft, a second timer member having a limited movement relatively to the first member and connections between the sleeve and said second member for timing the ignition irrespective of the direction of rotation of the shaft.

10. An internal combustion engine having jump spark ignition, comprising an intake valve and an exhaust valve, a shaft rotated by the engine, means for reversing the direction of rotation of the shaft, a sleeve carried on the shaft, a cam on the sleeve for actuating the intake valve, a cam on the sleeve for actuating the exhaust valve, said member being movable longitudinally of the shaft, an electric timer having a member rotated by the shaft, a second timer member having a limited movement relatively to the first member, connections between the sleeve and said second member for advancing the spark irrespective of the direction of rotation of the shaft, and means for adjusting the degree of advance alike for either direction of rotation.

11. An internal combustion engine having jump spark ignition, comprising an intake valve and an exhaust valve, a shaft rotated by the engine, means for reversing the direction of rotation of the shaft, a sleeve carried on the shaft, a cam on the sleeve for actuating the intake valve, a cam on the sleeve for actuating the exhaust valve, said member being movable longitudinally of the shaft, an electric timer having a member rotated by the shaft, a second timer member having a limited movement relatively to the first member, connections between the sleeve and said second member for advancing or retarding the spark irrespective of the direction of rotation of the shaft, a pair of stops one on either side of a medial line, and means whereby movement of one of said stops relatively to the line will move the other stop an equal distance relatively to the medial line whereby movement of the one stop to limit the spark advance or retardation when the shaft is rotating in one direction will automatically set the other stop to give the same advance or retardation when the shaft rotates in the other direction.

12. An internal combustion engine having jump spark ignition, comprising an intake valve and an exhaust valve, a shaft rotated by the engine, means for reversing the direction of rotation of the shaft, a sleeve carried on the shaft, a cam on the sleeve for actuating the intake valve, a cam on the sleeve for actuating the exhaust valve, said member being movable longitudinally of the shaft, an electric timer having a member rotated by the shaft, a second timer member having a limited movement relatively to the first member, connections between the sleeve and said second member for advancing or retarding the spark irrespective of the direction of rotation of the shaft, a pair of stops one on either side of a medial line, means whereby movement of one of said stops relatively to the line will move the other stop an equal distance relatively to the medial line whereby movement of the one stop to limit the spark advance or retardation when the shaft is rotating in one direction will automatically set the other stop to give the same advance or retardation when the shaft rotates in the other direction, and means for locking the stops in position.

13. An engine of the four stroke cycle type, having a shaft, a valve, means actuated by the shaft for actuating the valve, said means being moved longitudinally, in relation to the shaft, by momentum, when the direction of rotation of the shaft is reversed, an electric timer having a rotating member and a non-rotating member, means for moving the non-rotating member, in relation to the engine, such means being actuated by the longitudinal movement of the valve actuating means.

This specification signed this 24th day of August, 1925.

LEONARD H. DYER.